UNITED STATES PATENT OFFICE.

THOMAS B. STILLMAN, OF PLAINFIELD, N. J., ASSIGNOR TO THE EASTERN ELECTRIC MANUFACTURING COMPANY, OF MIDDLETOWN, CONN.

MANUFACTURE OF NITROGEN GAS.

SPECIFICATION forming part of Letters Patent No. 225,730, dated March 23, 1880.

Application filed January 17, 1880.

*To all whom it may concern:*

Be it known that I, THOMAS BLISS STILLMAN, a resident of the United States, residing at Plainfield, in the county of Union and State of New Jersey, have invented certain new and useful Improvements in the Manufacture of Nitrogen Gas, of which the following is a full, clear, and exact description.

There are several well-known methods of obtaining nitrogen gas; but as the text-books contain full particulars regarding them I have not deemed it necessary to enter into a description here.

The object of my invention is to obtain the gas in an economical manner and of sufficient purity to be used in the sealed globes of electric lamps, like those of Sawyer and Man, Letters Patent of the United States No. 210,809, dated December 10, 1878.

As ordinarily obtained the gas is not sufficiently pure, for the reason that it contains traces of oxygen or its compounds, and upon use of lamps of this order the carbon pencils brought to incandescence are gradually consumed.

Experience has disproved the theory that when carbon is intensely heated in a sealed chamber whatever oxygen there may be present is soon fixed by its chemical combination with carbon to form the dioxide or the monoxide of carbon. The temperature of the pencil of carbon in the Sawyer-Man lamp is so high as to disintegrate these gases when they come in contact with it, carbon being deposited upon the interior surfaces of the lamp and oxygen attacking fresh carbon; and it has been found that this circular action continues, so that in time the least oxygen will destroy an indefinitely large piece of carbon.

In the ordinary process of obtaining nitrogen from ammonic chloride and potassic nitrite the product is not nitrogen alone, but also ammonia and nitric acid. The ammonia is removed by passing the gas through a dilute solution of sulphuric acid, colored red by litmus, in order that warning may be given, when the ammonia is in excess, by the solution turning blue; and the nitric oxide is removed by next passing the gas through a concentrated solution of ferrous sulphate. Next, to remove oxygen, the gas is passed through an alkaline solution of pyrogallic acid, and then, to free it from moisture, through a tube or Wolff's bottle filled with pieces of pumice-stone moistened with chemically-pure sulphuric acid. Afterward, to absorb carbonic-acid gas that may be present, a tube or bottle containing caustic potash in sticks is employed. The ferrous-sulphate solution ceases to act when its color becomes dark brown.

Notwithstanding the degree of perfection of this process and the great care used in its manipulation, it was found next to impossible to eliminate all traces of oxygen, and traces of moisture were invariably present. To remedy these difficulties I take the gas thus purified and pass it through any suitable apparatus, such as chemists employ, filled with a dry salt, as anhydrous chloride of zinc, anhydrous sulphuric acid, or anhydrous phosphoric acid, with a preference for the last-named, which has such an affinity for moisture that it will take water from chemically-pure oil of vitriol. I finally pass the gas through melted sodium, potassium, or other metal having a great affinity for oxygen when in the liquid state, whereby every trace of oxygen is removed. This is done in the manner well known in chemical experiments by means of a Wolff's bottle, made preferably of Russia iron.

I prefer to put the sodium, potassium, or the metal used, into the apparatus cold, and sufficient nitrogen is run through to practically fill the same before heat is applied. Under these circumstances very little oxygen is present, and it is possible to melt the sodium or potassium without consuming it.

I am aware that sodium and potassium, both heated and in the natural state, have been employed as deoxidizing agents; but their action is far inferior to the melted metal, inasmuch as much oxygen may pass over the cold or even the merely heated metal.

To guard against the movement of the gas through the various purifying chemicals carrying over any of the chemicals bodily, plugs of cotton, wool, or other fibrous material closely packed may be placed in the openings of the tubes, Wolff's bottles, or other apparatus containing the purifying chemicals.

Having thus fully described my invention, what I claim as such, and desire to secure by Letters Patent, is—

In the manufacture of nitrogen gas, the process of removing oxygen which consists in passing the gas through melted sodium, potassium, or other metal having a high affinity for oxygen contained in a close vessel.

THOS. B. STILLMAN.

Witnesses:
E. R. KNOWLES,
WM. G. CONKLIN.